(12) United States Patent
Mysin et al.

(10) Patent No.: US 9,746,050 B2
(45) Date of Patent: Aug. 29, 2017

(54) SPRING FUNCTION COMPONENT FOR A HYDROELASTIC BEARING

(71) Applicant: Anvis Deutschland GmbH, Steinau an der Strasse (DE)

(72) Inventors: Aleksey Mysin, Togliatti (RU); Dimitry Khlistunov, Bad Soden-Salmünster (DE)

(73) Assignee: Anvis Deutschland GmbH, Steinau an der Strasse (DE)

( * ) Notice: Subject to any disclaimer, the term of this patent is extended or adjusted under 35 U.S.C. 154(b) by 56 days.

(21) Appl. No.: 14/948,699

(22) Filed: Nov. 23, 2015

(65) Prior Publication Data

US 2016/0146287 A1  May 26, 2016

(30) Foreign Application Priority Data

Nov. 24, 2014  (DE) .......................... 10 2014 017 386

(51) Int. Cl.
*F16F 13/10* (2006.01)
*F16F 13/14* (2006.01)

(52) U.S. Cl.
CPC .......... *F16F 13/1472* (2013.01); *F16F 13/10* (2013.01); *F16F 13/103* (2013.01); *F16F 13/108* (2013.01)

(58) Field of Classification Search
CPC ........ F16F 13/108; F16F 13/103; F16F 13/10; F16F 13/1472
USPC ........ 267/140.12, 141.2, 141.3, 140.13, 292, 267/293, 220
See application file for complete search history.

(56) References Cited

U.S. PATENT DOCUMENTS

| 4,822,010 A | 4/1989 | Thorn |
| 5,516,083 A * | 5/1996 | Sprang ............... F16F 13/1427 |
| | | 267/140.12 |
| 6,168,144 B1 | 1/2001 | Bruehl |
| 7,370,852 B2 * | 5/2008 | Nicholson ............... F16F 1/387 |
| | | 267/140.12 |

(Continued)

FOREIGN PATENT DOCUMENTS

| DE | 4233705 A1 | 4/1994 |
| DE | 4332367 A1 | 3/1995 |

(Continued)

*Primary Examiner* — Thomas J Williams
*Assistant Examiner* — Mariano Sy
(74) *Attorney, Agent, or Firm* — Armstrong Teasdale LLP (57) ABSTRACT

A spring function component for a hydroelastic bearing is provided. The component includes an inner mounting connection, an outer mounting connection that radially encircles the inner mounting connection, and a spring body that flexibly connects the inner mounting connection and the outer mounting connection. The outer mounting connection is configured to be installed in an outer sleeve. In an assembled state of the outer mounting connection, the spring body at least partly forms a boundary between two working chambers configured to hold of a damping fluid, at least one choke channel is formed that hydraulically connects the working chambers to each other, and in addition to the choke channel there is at least one pressure relief valve configured so that when a specific pressure differential between the working chambers is exceeded, the at least one pressure relief valve opens and hydraulically connects the working chambers.

20 Claims, 4 Drawing Sheets

(56) References Cited

U.S. PATENT DOCUMENTS

| | | | |
|---|---|---|---|
| 7,540,478 B2* | 6/2009 | de Fontenay | B60G 7/006 267/140.12 |
| 8,167,286 B2* | 5/2012 | Hirano | F16F 1/38 188/379 |
| 8,960,654 B2* | 2/2015 | Kojima | F16F 13/10 248/562 |
| 9,422,999 B2* | 8/2016 | Hermann | |
| 2005/0035507 A1* | 2/2005 | de Fontenay | F16F 13/1472 267/140.12 |
| 2006/0119025 A1 | 6/2006 | Kato et al. | |
| 2006/0131801 A1* | 6/2006 | Barickman | B62D 33/0604 267/293 |

FOREIGN PATENT DOCUMENTS

| | | |
|---|---|---|
| DE | 60214212 T2 | 10/2007 |
| DE | 60316914 T2 | 7/2008 |

* cited by examiner

SPRING FUNCTION COMPONENT FOR A HYDROELASTIC BEARING

CROSS REFERENCE TO RELATED APPLICATIONS

This application claims the benefit of DE Patent Application No. 10 2014 017 386.0 filed Nov. 24, 2014, which is hereby incorporated by reference in its entirety.

BACKGROUND OF THE DISCLOSURE

This invention relates to a spring function component for a hydroelastic bearing.

Hydrostatic bearings can be used in a motor vehicle, for example. For example, a hydroelastic bearing can be used as a bearing for a cross member or a control arm, in particular a transverse control arm. In the case of its use as a cross member bearing, a system of a plurality of hydroelastic bearings, in particular four hydroelastic bearings, is provided, which are to be installed on the motor vehicle in four predetermined installation positions. When installed, the hydroelastic bearings of the system are aligned such that their axial directions correspond to a vertical line.

The hydroelastic bearing is generally used when a relative movement of a component such as a motor vehicle component that is subjected to an oscillating load relative to the vehicle body is to be permitted and damped. Because of the use of elastomer material, the hydroelastic bearing provides restoring spring forces as well as damping forces that are actively induced by means of dissipation losses inside the bearing.

Generally, the spring function component has an inner mounting connection by means of which the bearing is to be mounted on a component such as the vehicle body of a motor vehicle, which is subjected to an oscillating load. Another component, such as a motor vehicle component to be fastened to the motor vehicle body, is conventionally fastened to the spring function component by means of an outer mounting connection. A reversed connection of the spring function component to the motor vehicle body can also be considered. A spring body couples the mounting connections to one another in order to permit a relative mobility of the mounting connections. The spring body at least partly delimits two working chambers which are designed to receive a damping fluid. The working chambers can communicate hydraulically with each other via a choke channel to make possible an exchange of fluid between the working chambers at a predefined cross-sectional constriction to induce the dissipation losses through the flow between the working chambers. It is known that the damping characteristics can be defined by setting the flow resonance of the system of working chambers.

In the event of an excessively rapid relative movement between the inner mounting connection and the outer mounting connection, e.g. when the vehicle travels over a pothole, very high pressures can occur in one of the working chambers. This high pressure is caused by the fact that during impact loads of this type, the damping fluid cannot flow into the other working chamber fast enough via the choke channel. As a result, the spring function component of the hydroelastic bearing can burst open in the vicinity of the loaded working chamber.

To prevent a bursting of the spring function component in the event of an overload, the spring function component can include a pressure relief valve that opens when a defined pressure is exceeded in one of the working chambers and forms a hydraulic connection between the working chambers. However, it has been found to be difficult to correctly set the opening pressure of pressure relief valves of this type. Moreover, there have been problems with the manufacture of a pressure relief valve of this type.

BRIEF DESCRIPTION OF THE DISCLOSURE

The embodiments described herein provide a spring function component for a hydroelastic bearing that makes possible a simple setting of the opening pressure of the pressure relief valve and is simple to manufacture.

In a first aspect, a spring function component for a hydroelastic bearing is provided. The spring function component includes an inner mounting connection, an outer mounting connection that radially surrounds the inner mounting connection, and a spring body that flexibly connects the inner mounting connection and the outer mounting connection with each other. The inner mounting connection is designed so that it can be installed in an outer sleeve of the hydroelastic bearing, wherein the spring function part is designed so that in the assembled state of the outer mounting connection: the spring body at least partly delimits at least two working chambers that hold a damping fluid, there is at least one choke channel that hydraulically connects the working chambers, and in addition to the choke channel there is at least one pressure relief valve, which is configured to open and hydraulically connect the working chambers when a specific pressure differential between the working chambers is exceeded. The pressure relief valve includes at least one valve port that is located on the external surface of the outer mounting connection and between the working chambers, and at least one valve crosspiece which is located in the valve port and connects the valve port until the specified pressure differential is exceeded, wherein the valve crosspiece, in the pre-assembled state of the outer mounting connection, has a cross-section shape that tapers radially toward the outside, the radial outer tip of which projects beyond the sleeve contour of the outer sleeve by an overhang, and wherein the valve crosspiece, in the assembled condition of the outer mounting connection, has a bent area in which the radially outer tip of the valve crosspiece is bent by the outer sleeve in a predetermined direction of flow of the valve port.

The spring function component can be a spring function component for a hydroelastic bearing for the mounting of a cross member or a control rod, in particular of a transverse control rod, in a motor vehicle. The diameter of the spring function component can, for example, be between approximately 10 mm to approximately 200 mm, more particularly between approximately 50 mm and approximately 100 mm. The axial length of the spring function component, for example, can be between approximately 10 mm to approximately 200 mm, more particularly between approximately 50 mm and approximately 100 mm.

The inner mounting connection can be designed to be connected with a component that is subjected to an oscillating load, such as the body of a motor vehicle, for example. The inner mounting connection can be a continuous, essentially cylindrical recess, and the connection with the component exposed to an oscillating load can be made, for example, by means of a stud or bolt that runs through the recess. The inner mounting connection can have an inner framework or an inner sleeve that is made of a solid or rigid material such as metal, wherein the spring body and the outer assembly connector can be located around this inner framework. However, the inner framework must not be associated with the inner mounting connection, and the inner mounting connection can also be only the internal surface of the spring body that extends in the axial direction of the spring function component.

The outer mounting connection surrounds the inner mounting connection in the radial direction, wherein the axial extension of the outer mounting connection and of the inner mounting connection can be essentially the same length. The outer mounting connection can be essentially cylindrical and can be formed by the radial external surface of the spring function component.

The spring body connects the inner mounting connection and the outer mounting connection in a flexible manner and is made in particular of an elastomer material. The inner mounting connection, the outer mounting connection and the spring body can represent an elastomer component, wherein the spring function element can have reinforcement elements made of metal or plastic that are embedded in the elastomer material. Reinforcement elements can include, for example, a reinforcement cage and/or the inner framework or inner sleeve of the inner mounting connection. In particular, the inner mounting connection, outer mounting connection, and spring body can be manufactured in a common tool, for example, as part of the injection molding process, wherein any reinforcement elements that are present can be injection molded in place.

The outer mounting connection is designed so that it can be installed in an outer sleeve of a hydroelastic bearing. In particular, the outer mounting connection is designed to match the internal contour of the outer sleeve of the hydroelastic bearing so that the outer mounting connection can be introduced with an accurate fit into the external sleeve. "With an accurate fit" means that the outer mounting connection is in contact at least in certain areas all the way around in the peripheral direction against the inside surface of the outer sleeve. The outer assembly connector can, for example, have encircling sealing lips on each of its axial ends in the peripheral direction. For an effective transmission of force from the spring function component to the external sleeve, the outer mounting connection can be in contact over the broadest possible area with the inside surface of the outer sleeve. For this purpose the outer assembly sleeve can have contact projections that project outward in the radial direction and in the assembled condition are in contact with the inside surface of the outer sleeve. The outer mounting connection can also have, on one axial end, an axial sleeve stop that projects all the way around in the radial direction. The outer sleeve stop has an axial stop surface that in the assembled state is in contact with the axial end surface of the outer sleeve. For the assembly of the outer mounting connection in the outer sleeve, the outer mounting connection or the spring function component can be introduced into the outer sleeve up to the stop. The outer sleeve or the outer mounting connection may be essentially cylindrical, although it is not restricted to this shape.

In the assembled state of the spring function component in the outer sleeve of the hydroelastic bearing, the working chambers, the choke channel and the valve port can be sealed from the environment by the external sleeve, so that the damping fluid cannot escape from the hydroelastic bearing. The working chambers can be delimited in the axial direction by the outside chamber walls of the spring function component. The outside chamber walls can be a part of the spring body. The outside chamber walls can also be separated by a chamber partition, wherein the chamber partition can be part of the spring body. The outside chamber walls and/or the chamber partition can be in the form of membranes. The spring function component is designed so that as the result of a relative movement between the inner assembly connection and the outer mounting connection, the volume of one working chamber is decreased and the volume of the other working chamber is increased, whereupon the spring body exerts a restoring force to return the inner mounting connection and the outer mounting connection to the original position. During this process, the damping fluid from the working chamber that is becoming smaller can flow via the choke channel into the working chamber that is becoming larger. As the damping fluid flows from one working chamber into the other via the choke channel, dissipation losses occur that effect a damping.

The choke channel is formed between two working chambers and connects them hydraulically. The choke channel may be located on the outer surface of the spring function component or of the outer mounting connection. However, the choke channel can also run at least partly through the interior of the spring function component. The outer surface of the spring function component or of the outer mounting connection can have chamber apertures of the working chambers, wherein the choke channel extends along the outside surface of the spring function component or of the outer mounting connection from one chamber aperture to the other. The choke channel can be an elongated depression or groove or channel on the outside surface of the spring function component. The damping properties can be set by means of the length and/or the cross section of the choke channel. To increase the choke action, the choke channel can also extend in a zigzag pattern, at least in sections, along the outside surface of the spring function component or of the outer mounting connection. In the assembled condition, the choke channel can be bounded or closed by the outer sleeve of the hydroelastic bearing.

The function of the pressure relief valve is to protect the spring function component against destruction in the event of the occurrence of strong, sudden loads. In particular, the pressure relief valve opens if a pre-determined and/or pre-determinable (specific) pressure differential between the working chambers occurs, e.g. if there is a rapid relative motion of the inner mounting connection and the outer mounting connection when the vehicle runs over a pothole. Because the pressure relief valve hydraulically connects the working chambers, i.e. "short circuits" the working chambers, a rapid pressure equalization can take place between the working chambers and the outer wall of the chamber, and/or the chamber partition of the pressurized working chamber can be prevented from bursting.

The pressure relief valve has at least one valve port which is located on the outer surface of the outer mounting connection or of the spring function component and extends between at least two working chambers. The valve port can extend along the outer surface of the spring function component or of the outer mounting connection from one chamber aperture to the other. The valve port can be an elongated depression or groove or trough. The cross section area of the valve port can be larger than the cross section area of the choke channel, e.g. approximately 50% or approximately 100% larger. The valve port can extend over the outside periphery of the spring function component over a length that is shorter than the length of the choke channel. In particular, the length of the valve port can be approximately half, approximately one-third, approximately one-fifth or one-tenth of the length of the choke channel. The valve port may be designed so that the flow resistance is as small as possible, in particular less than the flow resistance in the choke channel. In the assembled state, the valve port is closed in the radial direction by the outer sleeve of the hydroelastic bearing.

When there are two working chambers, the chamber apertures can be located so that there is a shorter distance and a longer distance along the outside periphery of the spring function component or of the outer mounting connection between the chamber apertures. Then the throttle channel can be located, for example, along the shorter distance along the outside periphery of the spring function component or of the outer mounting connection between the chamber openings. In other words, the choke channel and the valve port then run from one working chamber to the other in opposite directions along the outside periphery of the spring function component or of the outer mounting connection. However, the choke channel and valve port can also be located adjacent to each other, e.g. parallel to each other.

In the at least one valve port there is at least one valve crosspiece that closes the valve port until the pre-determined and/or pre-determinable specific pressure differential is exceeded. "Close" in this case means that no damping fluid flows or can flow through the pressure relief valve from one working chamber into the other. The valve crosspiece can be integral with the valve port. In particular the valve port and valve crosspiece can be integral parts of the outer mounting connection or be part of the outer mounting connection.

The valve crosspiece extends from one valve port side wall to the opposite valve port side wall. In cross section, at a right angle to the general longitudinal direction, the valve crosspiece in the pre-assembled state has a shape that tapers radially outward. The general longitudinal direction of the valve crosspiece is the longitudinal direction of the valve crosspiece or the longitudinal direction along which the cross section of the valve crosspiece remains essentially constant. The general longitudinal direction of the valve crosspiece can be straight or bent or curved. In cross section, transverse to the general longitudinal direction, the valve crosspiece in the pre-assembled state can have an essentially triangular shape, wherein one leg of the triangle is connected with the base of the valve port.

The radially outer tip of the valve crosspiece, in the pre-assembled state, projects beyond the envelope contour of the outer sleeve by an overhang length. The envelope contour is, in this case, at least the envelope contour of the inner surface of the outer sleeve. The radially outer tip of the valve crosspiece in the pre-assembled state can also project beyond the envelope contour of the outer surface of the outer sleeve. The overhang length, however, means the difference between the radius of the outer tip of the valve crosspiece and the radius of the inner surface of the outer sleeve. The overhang length can, for example, be between approximately 0.1 mm and approximately 5 mm, more particularly between approximately 0.5 mm and approximately 3 mm. The remaining areas of the outer mounting connection, which in the assembled state are in the interior of the outer sleeve and are in contact with the inner surface of the outer sleeve, have a radius that is a maximum of approximately equal to that of the inside surface of the outer sleeve.

The overhang length, the path of the general longitudinal direction of the valve crosspiece and the cross-section configuration of the valve crosspiece transverse to the general longitudinal direction can be set by means of the cross-section configuration of the valve port and the opening pressure of the pressure relief valve can be set by means of the material of the valve crosspiece.

On account of the overhang length, the radially outer tip of the valve crosspiece can be bent or snapped off during the assembly of the spring function component or of the outer mounting connection in the outer sleeve by the outer sleeve. The general longitudinal direction, as well as the cross section of the valve crosspiece, can be set so that during the assembly of the outer mounting connection, the outer tip of the valve crosspiece is automatically bent by the outer sleeve in the predetermined or pre-determinable direction of flow of the valve port. However, alternatively or additionally, the contour of the outer sleeve can be configured and/or an assembly tool can be used to bend the tip of the valve crosspiece in the pre-determined or pre-determinable direction of flow of the valve port. "Bend" means that the radially outer tip of the valve crosspiece is inclined or curved in a direction at a right angle to the radial longitudinal direction of the valve crosspiece in the pre-assembled state. Because the bent area of the valve crosspiece is in contact against the inside surface of the outer sleeve, the one side of the valve port separated by the valve port is sealed off from the other side and a pressure relief valve is formed.

On account of the configuration of the valve crosspiece described herein, a pressure relief valve can advantageously be provided in the spring function component that can be manufactured easily and makes possible a simple setting of the opening pressure. For example, the pressure relief valve has a valve port with a pre-determinable direction of flow. As a result of the bent tip of the valve crosspiece, the valve crosspiece is essentially concave on one side of the valve port and essentially convex on the other side of the valve port. Therefore when there is pressure from the concave side (i.e. when the pressure is opposite to the direction of flow), a self-retention effect occurs, because the bent area or the tip of the valve crosspiece is pressed by the pressure against the inside surface of the outer sleeve. When there is a pressure from the convex side (i.e. pressure in the direction of flow), on the other hand, the relief valve reproducibly opens at an opening pressure that is easy to set.

A particular advantage is that the bent shape of the valve crosspiece does not need to be introduced into the spring function component at the time of manufacture. A shape of this type specifically has undercuts that may be very disadvantageous during manufacturing, in particular during the injection molding of the elastomer component. In the embodiments described herein, the spring function component can be manufactured in a simple manner and the bent shape of the valve crosspiece is produced only during the assembly of the spring function component in the outer sleeve of the hydroelastic bearing by bending the radially outer tip of the valve crosspiece by means of the outer sleeve.

The general longitudinal direction of the valve crosspiece may be at least partly inclined by an angle relative to the axial direction of the spring function component so that during the introduction of the outer mounting connection into the outer sleeve of the hydroelastic bearing, the radially outer tip of the valve crosspiece is bent by a front edge of the outer sleeve in the pre-determinable direction of flow of the valve port.

"At least partly inclined by an angle relative to the axial direction of the spring function component" means that the general longitudinal direction of the valve crosspiece can run at least partly also parallel to the axial direction of the spring function component. In particular on a forward end of the valve crosspiece in the axial direction that comes in contact first with the outer sleeve during the mounting of the spring function component, the general longitudinal direction of the valve crosspiece is inclined at an angle relative to the axial direction of the spring function component. So that during the introduction of the outer mounting connection into the outer sleeve of the hydroelastic bearing, the radial outer tip of the valve crosspiece is bent by the forward edge of the outer sleeve in the pre-determinable direction of flow of the valve port. The general longitudinal direction of the valve crosspiece is inclined at least partly relative to the axial direction of the spring function component in the pre-determinable direction of flow. The angle of inclination can be between approximately 1° and approximately 60°, more particularly between approximately 5° and approximately 45°, at least on the forward end of the valve crosspiece in the axial direction.

By means of the inclined general longitudinal direction of the valve crosspiece, a particularly simple assembly of the hydroelastic bearing becomes possible. For example, the spring function component only needs to be inserted into the outer sleeve of the hydroelastic bearing, and the radially outer tip of the valve crosspiece is automatically bent by the outer sleeve in the correct pre-determinable direction of flow. If is further advantageous if the valve port is oriented in the peripheral direction of the spring function component so that the pressurizable surface of the valve crosspiece is increased by the inclined general longitudinal direction relative to the longitudinal direction of the valve port, which leads to an improved ability to set the opening pressure.

The pressure relief valve may have at least two valve ports with pre-determinable opposite directions of flow, wherein the two valve ports are separated by a central partition, each of which has a valve crosspiece, and wherein the respective valve crosspieces in the assembled state of the outer mounting connection each have a bent area, in which the radially outer tips of the respective valve crosspieces are bent by the outer sleeve in the respective pre-determinable directions of flow of the respective valve ports.

The central partition is located on the outside surface of the spring function component or on the outer mounting connection and can be in the form of a web or crosspiece. The general longitudinal direction of the partition can run essentially in the peripheral direction of the spring function component, wherein the diameter of the partition transverse to the general longitudinal direction of the partition can be in essentially constant contact at a right angle. The diameter of the partition can also be made larger for improved stability than the diameter of the valve crosspieces transverse to the general longitudinal direction of the valve crosspieces. In the assembled state, the radially outer surface of the center partition may be in contact with the inside surface of the outer sleeve. The side surfaces of the central partition each form one of the valve port side walls of the respective valve ports. In other words, the two valve ports can be designed so that so that a wide channel or a wide depression is formed on the outside assembly surface that essentially runs in the peripheral direction of the spring function component and the central partition is located in the wide channel. The central partition can be centrally located so that the cross sections of the respective valve ports are essentially equal. The valve crosspieces can each be connected with the central partition in the central area the general longitudinal direction of the central partition.

Because two valve ports with opposite pre-determined or pre-determinable directions of flow are formed, both working chambers are protected against overloading, because the damping fluid can flow both from the first working chamber to the second, as well as from the second working chamber to the first in the event of an overpressure via the respective valve ports. Because both valve ports have a valve crosspiece with the advantageously bent shape, the opening pressure can be effectively set in both directions of flow.

When there are two valve ports, each with a valve crosspiece, the respective general longitudinal directions of both valve crosspieces can be inclined at least partly relative to the axial direction of the spring function component, each by an angle.

The general longitudinal directions of the individual valve crosspieces may be inclined in opposite directions, at least partly, relative to the axial direction of the spring function component.

When the outer mounting connection is inserted into the outer sleeve, the respective radial outer tips of the respective valve crosspieces can advantageously be bent by the front edge of the outer sleeve into the respective opposite pre-determinable directions of flow. The respective angles of the general longitudinal directions of the individual valve crosspieces relative to the axial direction of the spring function component can be essentially equal in terms of magnitude.

According to an additional aspect, a hydroelastic bearing is provided. The hydroelastic bearing includes a spring function component as described above, and an outer sleeve, wherein the outer mounting connection of the spring function component is designed and constructed so that it can be installed in the outer sleeve.

BRIEF DESCRIPTION OF THE DRAWINGS

Example embodiments are described in greater detail below, with reference to the accompanying drawings, in which.

DETAILED DESCRIPTION OF THE DISCLOSURE

Figure 1:
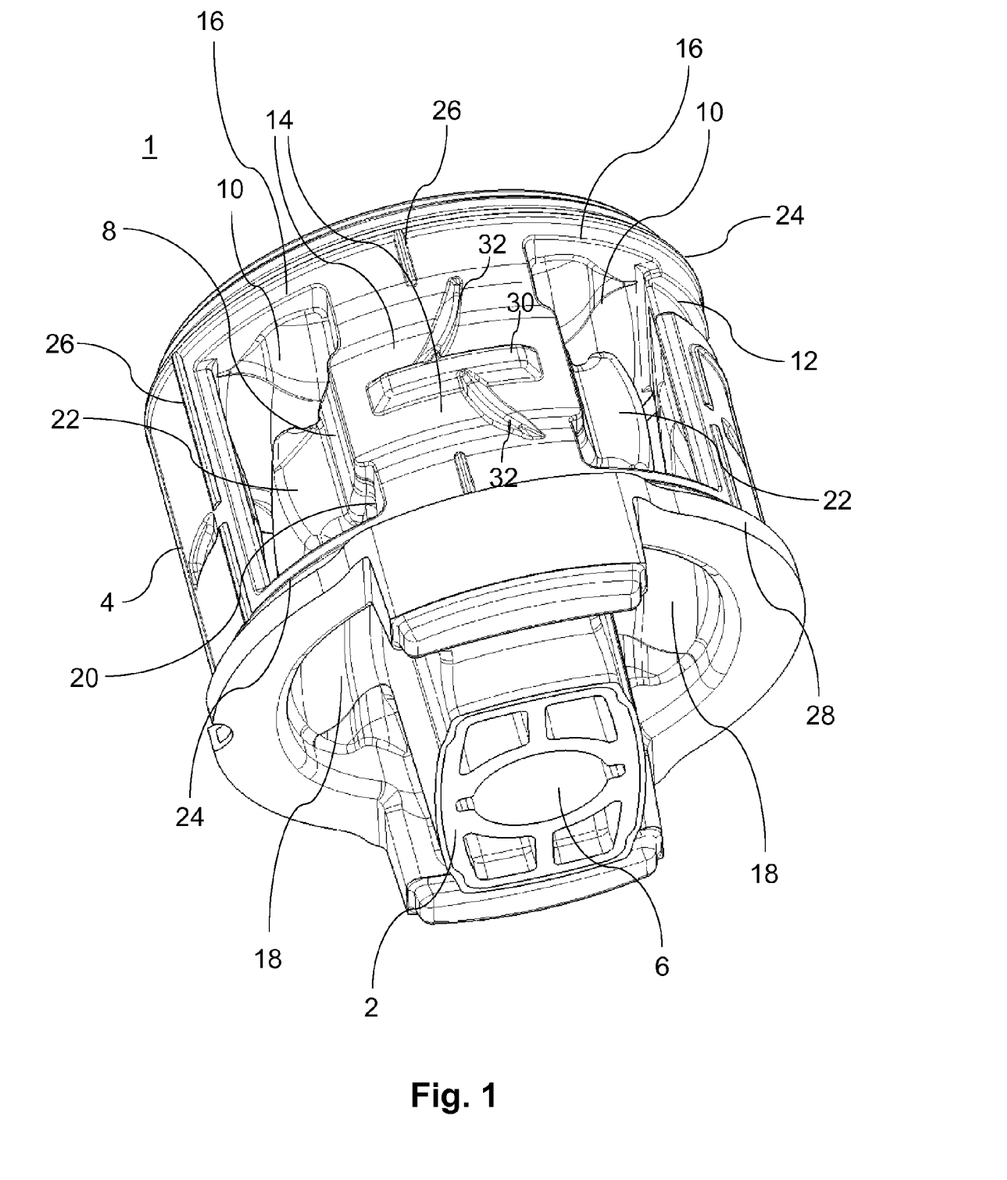
FIG. 1 is a view in perspective of a spring function component in an example embodiment.

FIG. 1 shows a view in perspective of a spring function component 1 in an example embodiment. The spring function component 1 has an inner mounting connection 2 in the form of an inner framework or inner sleeve. The inner framework or inner sleeve 2 may be made of metal and can have an essentially cylindrical through-hole 6 in which, for the function of the spring function component 1 (of the hydroelastic bearing), e.g. with a vehicle body, a bolt or pin can be inserted. An outer mounting connection 4 surrounds the inner mounting connection 2 in the radial direction. The inner mounting connection 2 and outer mounting connection 4 are connected by means of a spring body 8. The inner mounting connection 2, spring body 8 and outer mounting connection 4 are an injection molded component, wherein the spring body 8 and the outer mounting connection 4 are made of elastomer material injection molded around the inner framework. The spring function component 1 can have additional reinforcement elements such as a reinforcement cage, for example, in the interior of the component.

The outer mounting connection 4 is designed and constructed so that it can be installed in a cylindrical outer sleeve (not shown) of a hydroelastic bearing. FIG. 1, however, shows the pre-assembly state. In the assembled state, the working chambers 10 in or on the spring function component 1, the choke channel 12 and valve ports 14 are sealed fluid-tight against the environment so that no damping fluid can escape. In the assembled state, the outer sleeve of the hydroelastic bearing forms the radially outer boundary of the choke channel 12 and of the valve ports 14.

The working chambers 10 each have chamber apertures 16 that are open toward the outer mounting connection 4. The chamber apertures 16 each hydraulically connect the interior of the working chambers 10 with the choke channel 12 and the valve ports 14 which are located on the surface of the outer mounting connection 4. The working chambers 10 are each bounded in the axial direction by the outer chamber walls 18. The working chambers 10 are separated from each other by a chamber partition 20. The chamber outer walls 18 and the chamber partition 20 can be part of the spring body 8. The spring body 8 has two boundary stops 22 that project from the chamber partition 20 into the interior of the respective work chambers 10. In the event of an excessive relative displacement of the inner mounting connection 2 with respect to the outer mounting connection 4, one of the boundary stops 22 comes in contact with the inner surface of the corresponding working chamber 10 and thereby limits the relative displacement.

The outer mounting connection 4, on its axial ends, has encircling sealing lips 24 that run in the peripheral direction. For an effective transmission of force from the spring function component 1 to the outer sleeve, the outer mounting connection 4 has contact projections 26 that project in the radial direction and in the assembled state are in contact with the inner surface of the outer sleeve. The outer mounting connection, on one axial end, also has an outer sleeve stop 28 that projects in an encircling manner in the radial direction. The outer sleeve stop 28 has a stop surface that in the assembled state is in contact with the axial end surface of the outer sleeve.

On the surface or outer surface of the outer mounting connection 4 between the chamber apertures 16, there are two valve ports 14 that are separated from each other by a center partition 30. The valve ports 14 each extend from one chamber aperture 16 to the other chamber aperture 16. The valve ports 14, however, are each blocked by a valve crosspiece 32 which extends from the central partition 30 to the respective valve port sidewall over the entire width of the respective valve port 14. In the assembled state, the valve ports 14 and the valve crosspieces 32, in combination with the outer sleeve of the hydroelastic bearing, form a pressure relief valve that opens if a specific pressure differential between the working chambers 10 is exceeded and hydraulically connects the working chambers 10 via the respective valve port 14. "Open" in this case means that the valve crosspiece 32 is flexed or deformed by the pressure of the damping fluid and a gap is formed between the valve crosspiece 32 and the inner surface of the outer sleeve. The respective direction of flow of the valve port 14 is determined by the direction of the bend of the radial outer tip of the valve crosspiece 32 in the valve port 14.

Figure 2:
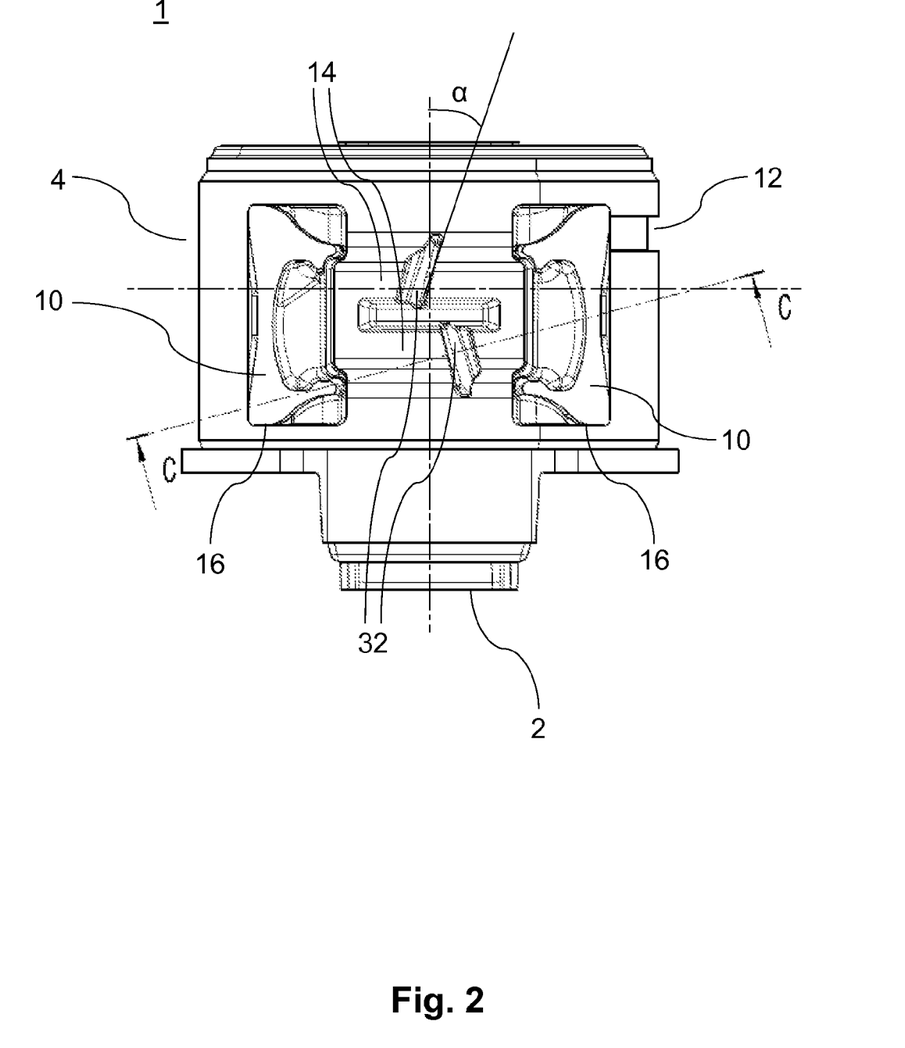
FIG. 2 is a side view of the spring function component shown in FIG. 1.

FIG. 2 shows a side view of the spring function component 1. As illustrated in FIG. 2, the general longitudinal direction of the respective valve crosspieces 32 relative to the axial direction of the spring function component 1, is inclined by an angle α. In this case, one of the valve crosspieces 32 (the upper one) is inclined clockwise with respect to the axial direction of the spring function component 1 by the angle α, and the other valve crosspiece 32 (the lower one) is inclined counterclockwise with respect to the axial direction of the spring function component 1 by the angle α. During the assembly of the spring function component 1 in the outer sleeve of the hydroelastic bearing, the radial outward tip of the upper valve crosspiece 32 is displaced or bent to the right by the inclined general longitudinal direction by the edge of the outer sleeve, while the radial outer tip of the lower valve crosspiece 32 is then displaced or bent to the left by the edge of the outer sleeve. Therefore the predetermined direction of flow of the upper valve port 14 is from left to right, and the predetermined direction of flow of the lower valve port is from right to left.

Figure 3:
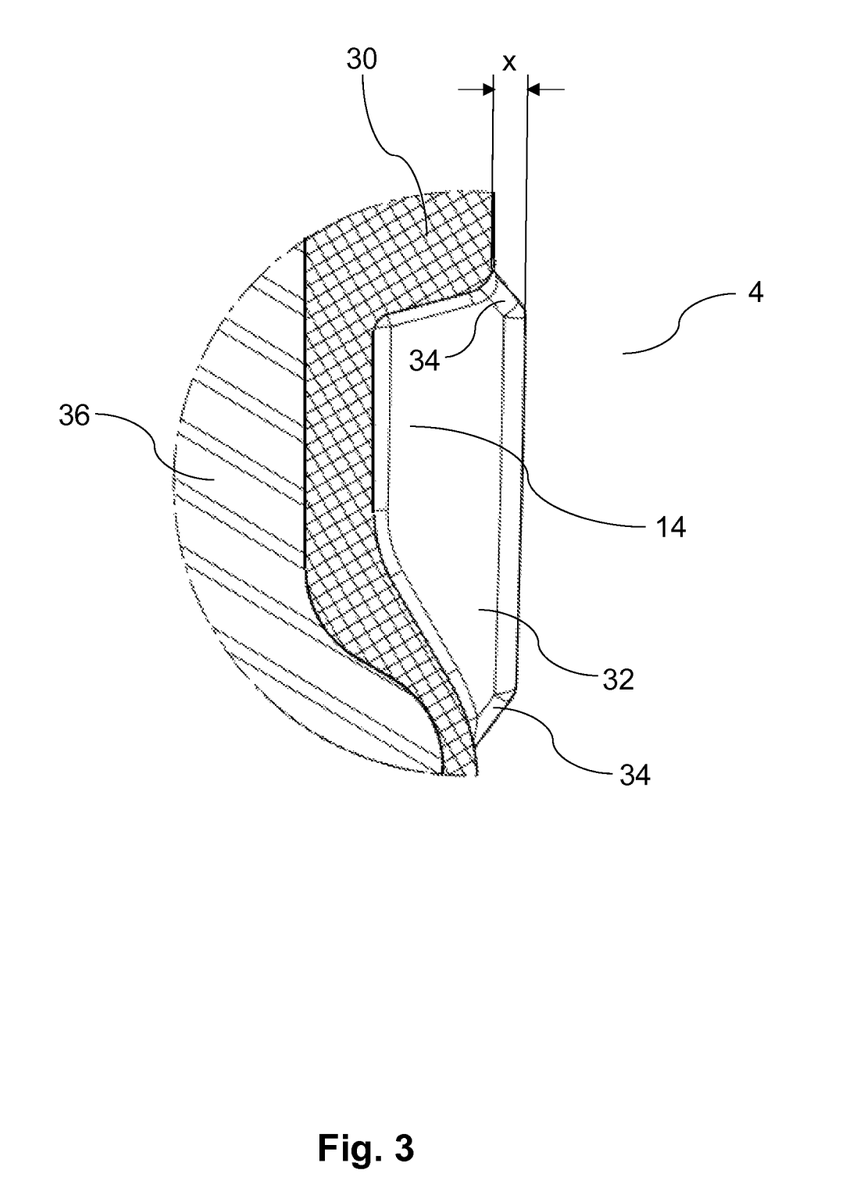
FIG. 3 is a sectional view of the spring function component parallel to the general longitudinal direction of the valve crosspiece.

FIG. 3 shows a side view of a spring function component 1 parallel to the general longitudinal direction of the valve crosspiece 32. The radially outer tip of the valve crosspiece 32, in the illustrated pre-assembled state, projects by an overhang length X beyond the envelope contour of the outer sleeve. In the assembled state, the radial outer surface of the center partition 30 is in contact with the inner surface of the outer sleeve. In the assembled state, the segment of the valve crosspiece 32 that projects by the overlap length X beyond the envelope contour of the outer sleeve is bent into the inner area of the outer sleeve. The valve crosspieces 32, on both their ends in the general longitudinal direction, each have a bevel 34 that facilitates the assembly of the spring function component, ensure a uniform bending process and guarantee an effective seal. Located underneath the elastomer material layer of the outer mounting connection 4 is a reinforcement cage 36 that is injection-molded during the manufacture of the spring function component.

Figure 4A:
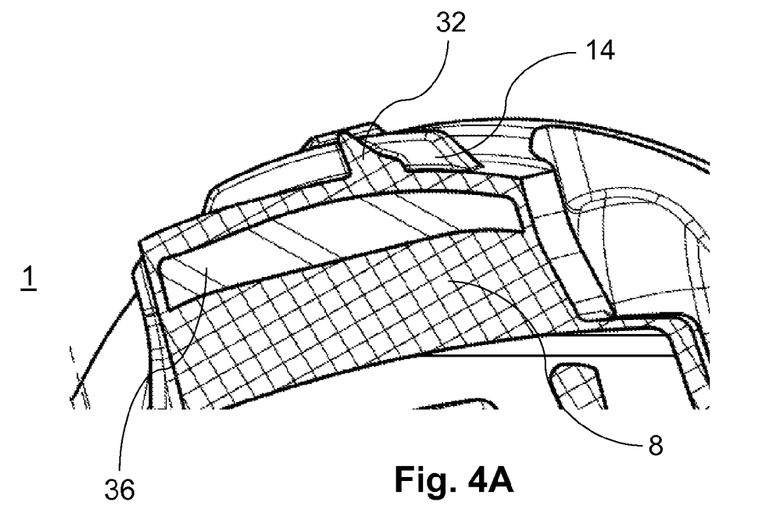
FIGS. 4A and 4B show sectional views of the spring function component along line C-C in FIG. 2.
Figure 4B:
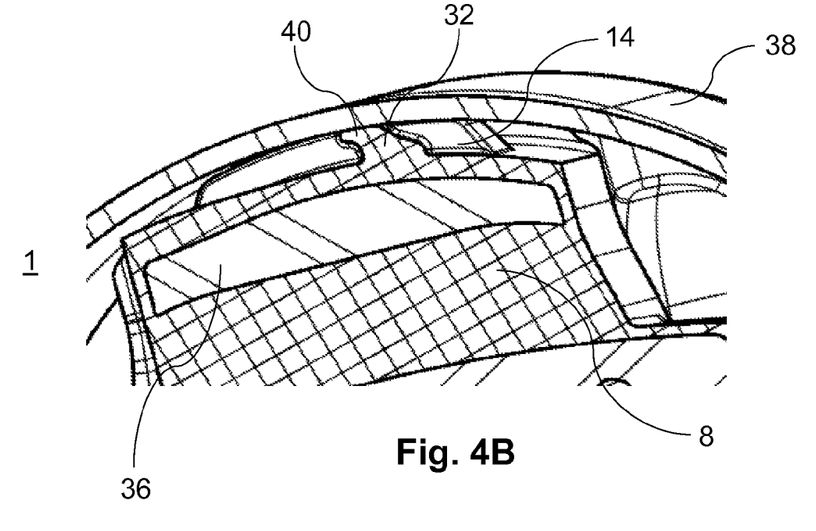

FIGS. 4A and 4B show side views of the spring function component 1 along line C-C in FIG. 2. FIG. 4A shows the pre-assembled state and FIG. 4B shows the assembled state.

In the pre-assemble state, the valve crosspiece 32, in cross-section at a right angle to the general longitudinal direction, has a shape that tapers radially outward. In particular, the valve crosspiece 32, in the pre-assembled state, has essentially no undercuts in the radial direction. The cross-section shape can be essentially triangular, wherein one of the legs of the triangle that is not connected with the base of the valve port can run essentially perpendicular to the base of the valve port. The essentially perpendicular leg may be located on the side into which the radial outward tip of the valve crosspiece open 32 is bent.

In the assembled state, i.e. when the spring function component 1 is installed or introduced into the outer sleeve 38, the valve crosspiece 32 is deformed by the outer sleeve 38 and has a bent area 40. In the bent area 40, the radial outward tip of the valve crosspiece 32 is bent in the pre-determinable direction of flow of the valve port 14. On the side of the valve crosspiece, into which the tip of the valve crosspiece 32 was bent, this creates a concave cross-section contour, and on the opposite side a convex cross-section contour is formed. When pressure is exerted from the concave side (i.e. pressure opposite to the direction of flow), a self-retention effect occurs, because the bent area 40 or the tip of the valve crosspiece 32 is pushed by the pressure against the inside surface of the outer sleeve 38. When pressure is exerted from the convex side (i.e. pressure in the direction of flow), on the other hand, the valve crosspiece 32 can be easily and reproducibly moved into the open position.

It goes without saying that this invention is not restricted to the example embodiment described above. Individual features of the embodiment can be combined into additional embodiments.

What is claimed is:

1. A spring function component for a hydroelastic bearing, the spring function component comprising:

an inner mounting connection;

an outer mounting connection that radially encircles the inner mounting connection; and a spring body that flexibly connects the inner mounting connection and the outer mounting connection with each other;

wherein the outer mounting connection is configured to be installed in an outer sleeve of the hydroelastic bearing, and wherein the spring function component is configured such that in an assembled state of the outer mounting connection:

the spring body at least partly forms a boundary between two working chambers configured to hold a damping fluid;

at least one choke channel is formed that hydraulically connects the working chambers to each other; and in addition to the choke channel there is at least one pressure relief valve configured so that when a specific pressure differential between the working chambers is exceeded, the at least one pressure relief valve opens and hydraulically connects the working chambers, wherein the at least one pressure relief valve comprises:

at least one valve port located on an outer surface of the outer mounting connection and between the working chambers; and at least one valve crosspiece located in the at least one valve port and configured to close the at least one valve port until the specific pressure differential is exceeded;

wherein the at least one valve crosspiece, in a pre-assembled state of the outer mounting connection, has a cross section that tapers radially outward such that a radially outer tip of the at least one valve crosspiece projects by an overhang length beyond an envelope contour of the outer sleeve; and wherein the at least one valve crosspiece, in the assembled state of the outer mounting connection, has a bent area in which the radially outer tip is bent by the outer sleeve in a pre-determinable direction of flow of the at least one valve port.

2. A spring function component as recited in claim 1, wherein a general longitudinal direction of the at least one valve crosspiece is inclined at least partly relative to an axial direction of the spring function component by an angle so that during an introduction of the outer mounting connection into the outer sleeve of the hydroelastic bearing, the radial outer tip of the at least one valve crosspiece is bent by a leading edge of the outer sleeve in the pre-determinable direction of flow of the at least one valve port.

3. A spring function component as recited in claim 1, wherein the at least one pressure relief valve has at least two valve ports with pre-determinable opposite directions of flow.

4. A spring function component as recited in claim 2, wherein the at least one pressure relief valve has at least two valve ports with pre-determinable opposite directions of flow.

5. A spring function component as recited in claim 4, wherein the general longitudinal directions of the valve crosspieces in the at least two valve ports are at least partly inclined in opposite directions relative to the axial direction of the spring function component.

6. A spring function component as recited in claim 1, further comprising a reinforcement cage positioned in an interior of the spring function component.

7. A spring function component as recited in claim 1, wherein the spring body comprises a plurality of boundary stops.

8. A spring function component as recited in claim 1, wherein the outer mounting connection comprises a plurality of contact projections.

9. A hydroelastic bearing comprising:

an outer sleeve; and a spring function component comprising:

an inner mounting connection;

an outer mounting connection that radially encircles the inner mounting connection; and a spring body that flexibly connects the inner mounting connection and the outer mounting connection with each other;

wherein the outer mounting connection is installed in the outer sleeve, and wherein the spring function component is configured such that in an assembled state of the outer mounting connection:

the spring body at least partly forms a boundary between two working chambers configured to hold a damping fluid;

at least one choke channel is formed that hydraulically connects the working chambers to each other; and in addition to the choke channel there is at least one pressure relief valve configured so that when a specific pressure differential between the working chambers is exceeded, the at least one pressure relief valve opens and hydraulically connects the working chambers, wherein the at least one pressure relief valve comprises:

at least one valve port located on an outer surface of the outer mounting connection and between the working chambers; and at least one valve crosspiece located in the at least one valve port and configured to close the at least one valve port until the specific pressure differential is exceeded;

wherein the at least one valve crosspiece, in a pre-assembled state of the outer mounting connection, has a cross section that tapers radially outward such that a radially outer tip of the at least one valve crosspiece projects by an overhang length beyond an envelope contour of the outer sleeve; and wherein the at least one valve crosspiece, in the assembled state of the outer mounting connection, has a bent area in which the radially outer tip is bent by the outer sleeve in a pre-determinable direction of flow of the at least one valve port.

10. A hydroelastic bearing as recited in claim 9, wherein a general longitudinal direction of the at least one valve crosspiece is inclined at least partly relative to an axial direction of the spring function component by an angle so that during an introduction of the outer mounting connection into the outer sleeve of the hydroelastic bearing, the radial outer tip of the at least one valve crosspiece is bent by a leading edge of the outer sleeve in the pre-determinable direction of flow of the at least one valve port.

11. A hydroelastic bearing as recited in claim 9, wherein the at least one pressure relief valve has at least two valve ports with pre-determinable opposite directions of flow.

12. A hydroelastic bearing as recited in claim 10, wherein the at least one pressure relief valve has at least two valve ports with pre-determinable opposite directions of flow.

13. A hydroelastic bearing as recited in claim 12, wherein the general longitudinal directions of the valve crosspieces in the at least two valve ports are at least partly inclined in opposite directions relative to the axial direction of the spring function component.

14. A hydroelastic bearing as recited in claim 9, further comprising a reinforcement cage positioned in an interior of the spring function component.

15. A hydroelastic bearing as recited in claim 9, wherein the outer sleeve is substantially cylindrical.

16. A hydroelastic bearing as recited in claim 9, wherein the outer mounting connection comprises a plurality of contact projections.

17. A method of assembling a hydroelastic bearing, the method comprising:
   providing an outer sleeve; and
   inserting a spring function component into the outer sleeve, the spring function component including an inner mounting connection, an outer mounting connection that radially encircles the inner mounting connection, and a spring body that flexibly connects the inner mounting connection and the outer mounting connection with each other;
   wherein the outer mounting connection forms at least one pressure relief valve with the outer sleeve, the pressure relief valve including at least one valve port and at least one valve crosspiece located in the at least one valve port, the at least one valve crosspiece having a cross section that tapers radially outward such that, prior to inserting the spring function component into the outer sleeve, a radially outer tip of the at least one valve crosspiece projects by an overhang length beyond an envelope contour of the outer sleeve.

18. A method as recited in claim 17, wherein providing an outer sleeve comprises providing a substantially cylindrical outer sleeve.

19. A method as recited in claim 17, wherein the spring function component includes a reinforcement cage positioned in an interior of the spring function component.

20. A method as recited in claim 17, wherein the outer mounting connection of the spring function component includes a plurality of contact projections.

* * * * *